United States Patent Office 3,395,233
Patented July 30, 1968

3,395,233
METHOD OF COMBATTING INSECTS WITH PHENYL-THIOUREA COMPOUNDS
Dieter Duerr and Volker Dittrich, Basel, Switzerland, assignors to Ciba Limited, Basel, Switzerland, a company of Switzerland
No Drawing. Filed Mar. 9, 1966, Ser. No. 532,863
Claims priority, application Switzerland, Mar. 30, 1965, 4,389/65
12 Claims. (Cl. 424—322)

ABSTRACT OF THE DISCLOSURE

Preparations comprising as active principle a pesticidal amount of a compound of the formula

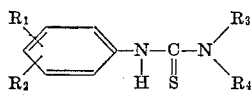

wherein $R_1$ and $R_2$ are identical or different and each represents a halogen atom or a lower alkyl radical, $R_3$ represents a lower alkyl radical or a lower alkoxy radical, and $R_4$ a hydrogen atom or a lower alkyl radical, together with a carrier, are effective in combating pests, particularly insects and acarides.

---

The present invention provides pesticidal, especially insecticidal and acaricidal, preparations containing, as active ingredient, a compound of the general formula

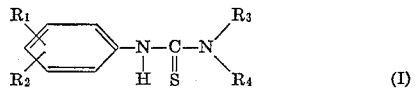 (I)

wherein $R_1$ and $R_2$ are identical or different and each represents a halogen atom or a lower alkyl radical, $R_3$ represents a lower alkyl radical or a lower alkoxy radical, and $R_4$ a hydrogen atom or a lower alkyl radical, together with a carrier. The preparations may contain one or several solvents, diluents, dispersants, wetting agents, adhesives and other pesticides.

The present invention provides especially those preparations of the kind defined which comprise, as active ingredient, a compound of the general formula

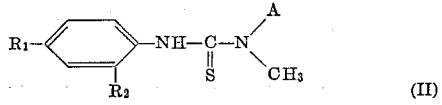 (II)

wherein $R_1$ and $R_2$ each represents chlorine, bromine or methyl and A represents a hydrogen atom or the methyl radical. The components of the formulae

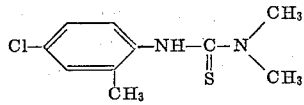

and

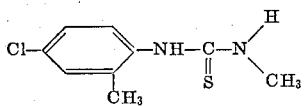

should be especially mentioned because of their potency.

The new preparations are especially advantageous when used for combating acarides; in this application it is of particular importance that they act against all stages of development, including the ova, of the acarides. Apart from their activity against harmful insects and acarides, the new preparations have also molluscicidal, nematocidal, and microbicidal, for example fungicidal and herbicidal, properties.

The last-mentioned compounds are especially active when used against Prodenia, for example *Prodenia ova*. The present invention relates also to the new compounds of general Formulae I and II given above.

The new compounds may be manufactured in the known manner. Some of these known methods are represented by the following reaction schemes, wherein $R_1$ to $R_4$ have the same meanings as in the above general Formula I:

TABLE 1

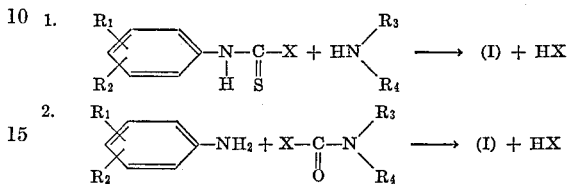

The symbol X stands for the group which is eliminated during the reaction, for example the $NH_2$, alkylthio, alkoxy, phenoxy group of halogen atom.

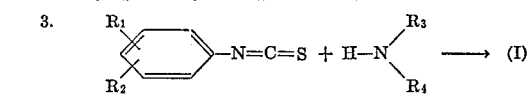

When $R_4$ in the general Formula I represents hydrogen:

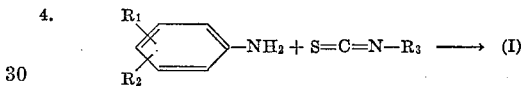

The preparations of this invention may be used in a wide varriety of forms. To manufacture solutions of compounds of the general Formula I for direct spraying there may be used, for example, petroleum fractions having a high to medium boiling range, preferably above 100° C., for example Diesel oil or kerosene, coal tar oils and oils of vegetable or animal origin, also hydrocarbons, for example alkylated naphthalenes, or tetrahydronaphthalene, if desired in combination with xylene mixtures, cyclohexanols or ketones, furthermore chlorinated hydrocarbons for example tri- and tetrachloroethane, trichloroethylene or tri- or tetrachlorobenzenes.

Aqueous forms of applications are obtained, for example, from emulsion concentrates, pastes or wettable spray powders by addition of water. Suitable emulsifiers, or dispersants are, for example, non-ionic products, for example condensation products of ethylene oxide with aliphatic alcohols, amines or carboxylic acids having a long-chain hydrocarbon residue of about 10 to 20 carbon atoms, for example the condensation product of octadecyl alcohol with 25 to 30 mols of ethylene oxide, or of soybean fatty acid with 30 mols of ethylene oxide, or of commercial oleylamine with 15 mols of ethylene oxide, or of dedocylmercaptan with 12 mols of ethylene oxide. Amongst the suitable anionic emulsifiers, there may be mentioned the sodium salt of dodecyl alcohol sulphuric acid ester, the sodium salt of dodecylbenzensulphonic acid, the potassium or triethanolamine salt of oleic or abietic acid or of mixtures of these acids, or the sodium salt of a petroleumsulphonic acid. Suitable cationic dispersants are quaternary ammonium compounds for example cetyl pyridinium bromide or dihydroxyethylbenzyl dodecyl ammonium chloride.

In the manufacture of dusting or casting preparations there may be used, as solid vehicles, talcum, kaolin, bentonite, calcium carbonate, calcium phosphate or coal, cork meal, wood meal or other materials of vegetable origin. It is also very advantageous to manufacture the new preparations in granular form. The various forms of application may contain the conventional additives for improving the distribution, adhesion, stability to rain and penetration, for example fatty acids, resins, glues, casein or alginates.

The preparations of the present invention may be used by themselves or in conjunction or admixture with conventional pesticides, especially insecticides, acaricides, nematocides, bactericides or fungicides or selective herbicides.

The following examples illustrate the invention.

Example 1

(a) N - 4 - chloro - 2 - methylphenyl-N',N'-dimethylthiourea.—110 grams of 4 - chloro - 2 - methylphenyl isothiocyanate are dissolved in 300 ml. of acetonitrile, and 75 ml. of aqueous dimethylamine solution of 40% strength are added. The temperature of the solution rises; 30 minutes later the product formed is precipitated by adding 1 litre of water. Yield: 131 grams. M.P. 173° to 175° C.

(b) N - 4-chloro-2-methylphenyl-N'-methylthiourea.—A solution of 111.8 g. of 4-chloro-2-methylaniline in 250 ml. of alcohol is mixed with 57.6 g. of methyl isothiocyanate and refluxed for 90 minutes. On addition of 1 litre of cold water, the urea formed is precipitated in the form of white crystals. Yield: 103 grams. M.P. 143.5° to 144.5° C.

(c) Further N-4-chloro-2-methylphenyl thioureas are obtained when dimethylamine in Example 1a is replaced by one of the following amines: Ethylamine, propylamine (normal or iso), butylamine (normal, iso or secondary), methylethylamine, a methylpropylamine, a dipropylamine or a dibutylamine.

(d) In the same manner as described in Example 1a, the following compounds are obtained from the appropriate monomethylamine or dimethylamine respectively and the appropriate phenyl isothiocyanate:

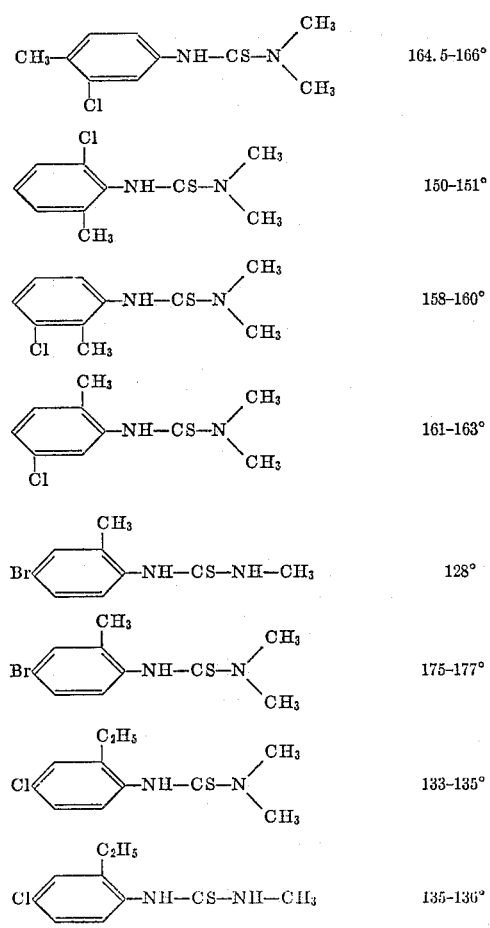

(e) The compound of the formula

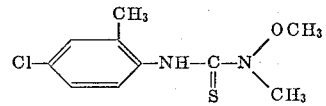

(melting at 98° to 100° C.) is obtained by reacting O,N-dimethylhydroxylamine with 4 - chloro - 2 - methylphenyl isothiocyanate as described in Example 1a.

Example 2

8 grams of the substance obtained in Example 1a are mixed with 8 g. of a mixture consisting of 400 parts of finely dispersed silica ("HISIL," registered trade name), 500 parts of kaolin (bolus alba), 70 g. of a condensation product of 1 mol of para-octylphenol with 6 to 10 mols of ethylene oxide and 30 g. of a wetting agent consisting of sodium heptadecenyl benzimidazolesulphonate, and the whole is then ground on a rod mill, to furnish a spray powder of 50% strength which gives with water, dispersions that can be diluted in any desired proportion.

Example 3

(a) Ovicidal effect.—Bush bean plants in the 2-leaf stage are infested with adult female spinning mites *Tetranychus telarius* (carmine red mite) by means of a pneumatic collector. After 24 hours, the female mites are blown off the leaves with a fine jet of carbon dioxide. The remaining ova, which are 1 to 24 hours old, were wetted after 24 and 48 hours with a fine spray of aqueous spray broths of different concentrations obtained by diluting the active substance obtained as described in Example 2. The following figures, representing the percentages of surviving larvae and dead ova are obtained by counting them:

TABLE II

| Concentration in percent | After 24 hours | | | After 48 hours | | |
|---|---|---|---|---|---|---|
| | Larvae | Ova | Killed | Larvae | Ova | Killed |
| 0.01 | 0 | 50 | 100 | 1 | 106 | 99 |
| 0.005 | 2 | 98 | 98 | 4 | 89 | 96 |
| 0.0025 | 0 | 50 | 100 | 2 | 78 | 98 |

(b) Acaricidal effect.—Bush bean plants in the 2-leaf stage, infested with all stages of *Tetranychus telarius* (carmine red mite) were sprayed all over with a spray broth obtained by diluting the pulverulent substance of Example 2 with water. Evaluation of the effect obtained was carried out by counting the surviving and the dead mites after seven days. The following acaricidal results were recorded:

TABLE III

| Concentration | Ova | Larvae | Adults |
|---|---|---|---|
| 0.08 | 100% | 100% | 95% |

Good results were also obtained with spray broths containing, instead of the compound of Example 1a, the compound of Example 1b, d or e, applied as described in Examples 3a and b.

What is claimed is:

1. The method for combating harmful insects which comprises applying to the locus infested therewith an insecticidally effective amount of a compound of the formula

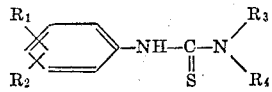

wherein $R_1$ and $R_2$ each represents a member selected from the group consisting of chlorine, bromine and lower alkyl, $R_3$ represents a member selected from the group consisting of lower alkyl and lower alkoxy, and $R_4$ represents a member selected from the group consisting of hydrogen and lower alkyl.

2. The method for combating harmful acarids which comprises applying to the locus infested therewith, an acaricidally effective amount of a compound of the formula

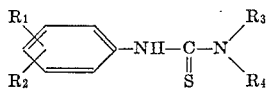

wherein $R_1$ and $R_2$ each represents a member selected from the group consisting of chlorine, bromine and lower alkyl, $R_3$ represents a member selected from the group consisting of lower alkyl and lower alkoxy, and $R_4$ represents a member selected from the group consisting of hydrogen and lower alkyl.

3. A method according to claim 1, wherein the compound is N-4-chloro-2-methylphenyl-N',N'-dimethyl thiourea.

4. A method according to claim 2 wherein the compound is N-4-chloro-2-methylphenyl-N',N'-dimethyl thiourea.

5. A method according to claim 1 wherein the compound is N-4-chloro-2-methylphenyl-N'-methylthiourea.

6. A method according to claim 2 wherein the compound is N-4-chloro-2-methylphenyl-N'-methylthiourea.

7. A method according to claim 1 wherein the compound is of the formula

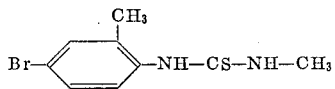

8. A method according to claim 2 wherein the compound is of the formula

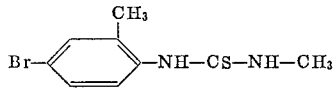

9. A method according to claim 1 wherein the compound is of the formula

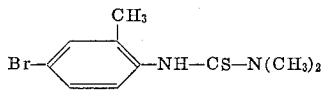

10. A method according to claim 2 wherein the compound is of the formula

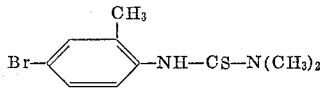

11. A method according to claim 1 wherein the compound is of the formula

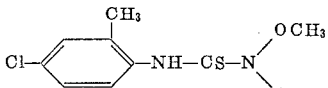

12. A method according to claim 2 wherein the compound is of the formula

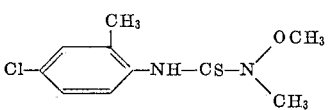

References Cited

UNITED STATES PATENTS 2,967,101   1/1961   Hamm et al. _____ 260—552 X
3,188,312   6/1965   Gundel et al. _____ 260—552 X

FOREIGN PATENTS 1,186,885   3/1959   France.

ALBERT T. MEYERS, *Primary Examiner.*

D. R. MAHANAND, *Assistant Examiner.*